United States Patent
Weslati et al.

(10) Patent No.: US 8,922,144 B2
(45) Date of Patent: Dec. 30, 2014

(54) METHOD OF PROCESSING SENSOR SIGNALS FOR DETERMINING MOTION OF A MOTOR SHAFT

(75) Inventors: Feisel Weslati, Troy, MI (US); Behrouz Ashrafi, Northville, MI (US); Chandan Lakshmanaiah, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 264 days.

(21) Appl. No.: 13/531,804

(22) Filed: Jun. 25, 2012

(65) Prior Publication Data

US 2013/0342140 A1     Dec. 26, 2013

(51) Int. Cl.
*H02P 6/14*    (2006.01)
*H02P 6/00*    (2006.01)
*H02P 6/16*    (2006.01)

(52) U.S. Cl.
USPC ...... 318/400.04; 318/615; 318/667; 318/560; 318/400.14; 318/721; 361/236; 702/151; 324/207.15

(58) Field of Classification Search
USPC ............... 318/400.04, 615, 667, 400.14, 721; 361/236, 51, 245, 242, 241; 324/160, 324/207.15; 700/304; 702/141, 142, 151
See application file for complete search history.

(56) References Cited

U.S. PATENT DOCUMENTS

| | | | |
|---|---|---|---|
| 4,145,608 A * | 3/1979 | Shirasaki et al. | 250/231.14 |
| 4,686,437 A | 8/1987 | Langley et al. | |
| 4,707,645 A | 11/1987 | Miyao et al. | |
| 4,714,913 A | 12/1987 | Cohen | |
| 4,719,397 A * | 1/1988 | Kneifel et al. | 318/567 |
| 5,163,033 A * | 11/1992 | Yanagi | 369/30.1 |
| 5,315,620 A | 5/1994 | Halawani et al. | |
| 5,343,393 A | 8/1994 | Hirano et al. | |
| 5,365,184 A | 11/1994 | Callender et al. | |
| 5,408,153 A | 4/1995 | Imai et al. | |
| 5,497,082 A | 3/1996 | Hancock | |
| 5,497,226 A | 3/1996 | Sullivan | |
| 5,787,375 A | 7/1998 | Madau et al. | |
| 6,279,713 B1 | 8/2001 | Young et al. | |
| 6,300,884 B1 | 10/2001 | Wilson | |
| 6,470,291 B1 | 10/2002 | Goker et al. | |
| 6,548,977 B2 * | 4/2003 | Vu et al. | 318/442 |
| 6,556,153 B1 | 4/2003 | Cardamone | |
| 6,791,293 B2 * | 9/2004 | Kaitani | 318/592 |
| 6,873,931 B1 * | 3/2005 | Nower et al. | 702/151 |
| 6,884,991 B2 * | 4/2005 | Durocher | 250/231.13 |
| 7,026,775 B2 * | 4/2006 | Kokubo et al. | 318/268 |
| 7,196,320 B1 | 3/2007 | Rickenbach | |

(Continued)

OTHER PUBLICATIONS

Histand & Alciatore, Introduction to Mechatronics and Measurement Systems, Digital Encoders, 4 pps., 1999 McGraw Hill.

(Continued)

*Primary Examiner* — Rita Leykin
(74) *Attorney, Agent, or Firm* — Ralph E Smith

(57) ABSTRACT

Methods and systems of processing sensor signals to determine motion of a motor shaft are disclosed. This disclosure relates to the processing of sequences of pulses from a sensor for computing the motion of an electric motor output shaft. Furthermore, this disclosure relates to the processing of two sequences of pulses from sensor outputs, which may be separated by only a few electrical degrees, to compute the motion of an electrical motor output shaft while using a limited bandwidth controller. Motor shaft direction, displacement, speed, phase, and phase offset may be determined from processing the sensor signals.

19 Claims, 10 Drawing Sheets

(56) References Cited

U.S. PATENT DOCUMENTS

| | | |
|---|---|---|
| 7,208,939 B2 | 4/2007 | Frederick et al. |
| 7,240,774 B2 | 7/2007 | Kramer |
| 7,425,821 B2 | 9/2008 | Monreal et al. |
| 7,535,382 B2 | 5/2009 | Jansson |
| 7,583,080 B2 * | 9/2009 | Uehira et al. ............ 324/207.25 |
| 7,872,439 B2 * | 1/2011 | Yasuda ......................... 318/704 |
| 7,872,683 B2 * | 1/2011 | Iwasaki ......................... 348/335 |
| 8,001,848 B2 | 8/2011 | White et al. |
| 8,152,156 B2 * | 4/2012 | Terada ...................... 271/10.13 |
| 8,284,289 B2 * | 10/2012 | Iwasaki ......................... 348/335 |
| 2003/0128026 A1 | 7/2003 | Lutz |
| 2006/0025959 A1 | 2/2006 | Gomez et al. |
| 2008/0083168 A1 | 4/2008 | Booth et al. |
| 2009/0021246 A1 * | 1/2009 | Uehira et al. ............ 324/207.25 |
| 2009/0050435 A1 | 2/2009 | Yamada et al. |
| 2009/0072130 A1 | 3/2009 | Chase et al. |
| 2010/0158180 A1 | 6/2010 | Ribo |
| 2010/0262880 A1 | 10/2010 | Vergnes et al. |

OTHER PUBLICATIONS

Jorge Zambada, Measuring Speed and Position with the QEI Module, 12 pps., 2005, Microchip Technology Inc.

Wikipedia, Parking Pawl, 1 pg., Feb. 6, 2012.

Wikipedia, Quadrature Phase, 1 pg., Jan. 31, 2012.

Simple Quadrature Decoder Suits Rotary Encoders, Rotary quadrature encloders, 2 pps., electronicdesign.com/print/analog-and-mixed-signal-quadrature-decoder suits, 2010, Penton Media, Inc.

Arduino playground, Reading Rotary Encoders, arduino.cc/playground/Main/RotaryEncoders, 43 pps., Feb. 22, 2012.

International Search Report and Written Opinion dated Oct. 2, 2013 for International Application No. PCT/US2013/046783, International Filing Date Jun. 20, 2013.

* cited by examiner

METHOD OF PROCESSING SENSOR SIGNALS FOR DETERMINING MOTION OF A MOTOR SHAFT

FIELD

The present disclosure relates generally to processing signals from sensors in a vehicle and, more specifically, to processing sequences of pulses from sensors for computing the motion of a motor shaft.

BACKGROUND

Detection devices such as Hall effect sensors and encoders can be used to generate quadrature phase signals. A rotating shaft attached to a motor is frequently connected to such a detection device.

A Hall effect sensor is a solid state detection device that varies its output voltage in response to a magnetic field. The Hall effect sensor operates as an analog transducer that returns a signal corresponding to the position of the magnet. With a known magnetic field, the magnet's distance from the Hall plate can be determined, or using groups of sensors, the relative position of the magnet can be deduced.

Encoders are commonly used to sense the motion of the shaft, in a wide range of applications such as in pulleys on top of cable car towers, or in a computer mouse. It is common for encoders to incorporate an electronic circuit that senses rotation of a rotating wheel that includes a series of evenly spaced apart openings. The electronic circuit counts each time the graduated disc permits light through one of the openings, and then is blocked by an opaque surface. The circuit determines the position of the shaft and counts the revolutions of the shaft.

Detection devices such as Hall effect sensors and encoders typically output a pulse string in response to the amount of rotational displacement of the shaft. Optical encoders can produce quadrature phase signals representative of linear or rotational displacement or some other variable parameter directly or after wave shaping. The quadrature phase signals may be processed to interface with a computer such as a microprocessor. In certain applications where devices of this type are intended to detect rotation, it is necessary to detect the rate of rotation of the target and the direction of rotation. If the shaft suddenly reverses direction, the sensor must be able to detect that reversal. This type of sensor can be found in automatic braking systems and other systems where speed and direction of rotation of a target must be determined.

Quadrature sensing involves the use of two signals that are offset from each other by 90 degrees. A comparison of the signals will provide meaningful information with regard to the position and direction of travel of a target. Using two digital outputs in quadrature is useful to determine direction and a change in angle of a motor shaft.

To determine the direction of rotation, the relative phase between the quadrature outputs are determined. One way to do this is to check the value of the first quadrature output at every edge of the second quadrature output. If the first signal is high when a rising edge is detected, then the first signal is ahead by a quarter period. Motion in the opposite direction is detected when the first signal is low when a rising edge is detected on the second output.

U.S. Patent Application Publication No. 2010/0158180 shows a method and apparatus for increasing jitter tolerance. U.S. Pat. No. 8,001,848 shows a method and device for measuring torque using sensor signals with a rotatable shaft. U.S. Pat. No. 5,315,620 shows a method for detecting and correcting phase errors. U.S. Pat. No. 5,365,184 shows a method and apparatus for quadrature phase processing to provide high dynamic range and phase recovery at reduced sample rates. U.S. Pat. No. 6,470,291 shows a method of providing accurate measurement of rotational velocity and an adequate bandwidth for servo control as a function of the measurement over a wide range of velocities.

Errors in these types of systems may occur, however, when the microprocessor cannot sample at a rate high enough to capture all of the phase changes of the output to determine the direction, either due to the limited bandwidth of the microprocessor, or the speed of the motor, or both. Also, errors are more prone to occur when the phases of the output are separated by less than 90 electrical degrees. Therefore, there exists a need for improvement in the art.

SUMMARY

In one form, the present disclosure provides a method of processing sensor signals to determine motion of a motor shaft, said method comprising the steps of sampling a first signal and a second signal via a controller, wherein the first signal is offset from the second signal; calculating a rotational direction and a displacement of the motor shaft from the first signal and the second signal when a count of samples taken without a state change is above a predetermined threshold; and calculating a displacement from the first signal and the second signal when the count of samples taken without a state change is below the predetermined threshold and a previous direction is assumed.

In another embodiment, calculating the rotational direction and displacement of the motor shaft from the first signal and the second signal when a count of samples taken without a state change is above a predetermined threshold further comprises detecting a phase offset between the first signal and the second signal. In yet another embodiment, calculating the displacement from the first signal and the second signal when the count of samples taken without a state change is below the predetermined threshold and a previous direction is assumed further comprises detecting the first signal and the second signal as being in phase.

In another embodiment, the first signal and the second signal in the step of calculating the displacement from the first signal and the second signal when the count of samples taken without a state change is below the predetermined threshold and a previous direction is assumed are offset from each other by 5 or less electrical degrees.

In some embodiments, the state change is based on a number of elapsed electrical degrees of the first signal. In another embodiment, the state change is based on an elapsed time. In another embodiment, the first signal is input from a detection device selected from the group consisting of an incremental encoder, a serial encoder, a rotary encoder, an absolute encoder, a resolver, a tachometer, and a Hall effect detection device.

In another embodiment, the method, further comprises the steps of determining a first speed of the motor shaft from the first signal and the second signal based on a count of samples taken by the controller without a state change occurring in the first signal and the second signal being above a predetermined threshold; and determining a second speed of the motor shaft from the first signal and the second signal based on a count of samples taken by the controller without a state change occurring in the first signal or the second signal being below the predetermined threshold.

In another embodiment, a speed of the motor shaft is determined from a sensor. In yet another embodiment, the method is used in a park pawl system of a vehicle. In another embodiment, the controller has a limited sampling capability. In yet another embodiment, the first signal is input from a Hall effect sensor.

In one form, the present disclosure provides a method of processing sensor signals to determine motion of a motor shaft, said method comprising the steps of sampling a first signal and a second signal via a controller, wherein the first signal is offset from the second signal; determining a first speed of the motor shaft from the first signal and the second signal based on a count of samples taken by the controller without a state change occurring in the first signal and the second signal being above a predetermined threshold; and determining a second speed of the motor shaft from the first signal and the second signal based on a count of samples taken by the controller without a state change occurring in the first signal or the second signal being below the predetermined threshold.

In another embodiment the method further comprises the step of calculating a rotational direction of the motor shaft from the first signal and the second signal. In yet another embodiment the method further comprises the step of calculating a displacement of the motor shaft from a signal, when a count of samples taken without a state change is above a predetermined threshold.

In another embodiment the method further comprises the steps of calculating a rotational direction and a displacement of the motor shaft from the first signal and the second signal when a count of samples taken without a state change is above a predetermined threshold; and calculating a displacement from the first signal and the second signal when the count of samples taken without a state change is below the predetermined threshold and a previous direction is assumed.

In another embodiment the method further comprises the step of calculating a displacement and direction of the motor shaft from processing the first signal and the second signal in combination to determine the displacement and direction of the motor shaft. In yet another embodiment the method further comprises the step of calculating a displacement of the motor shaft from processing the first signal and the second signal individually to determine the displacement of the motor shaft.

Further areas of applicability of the present disclosure will become apparent from the detailed description, drawings and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
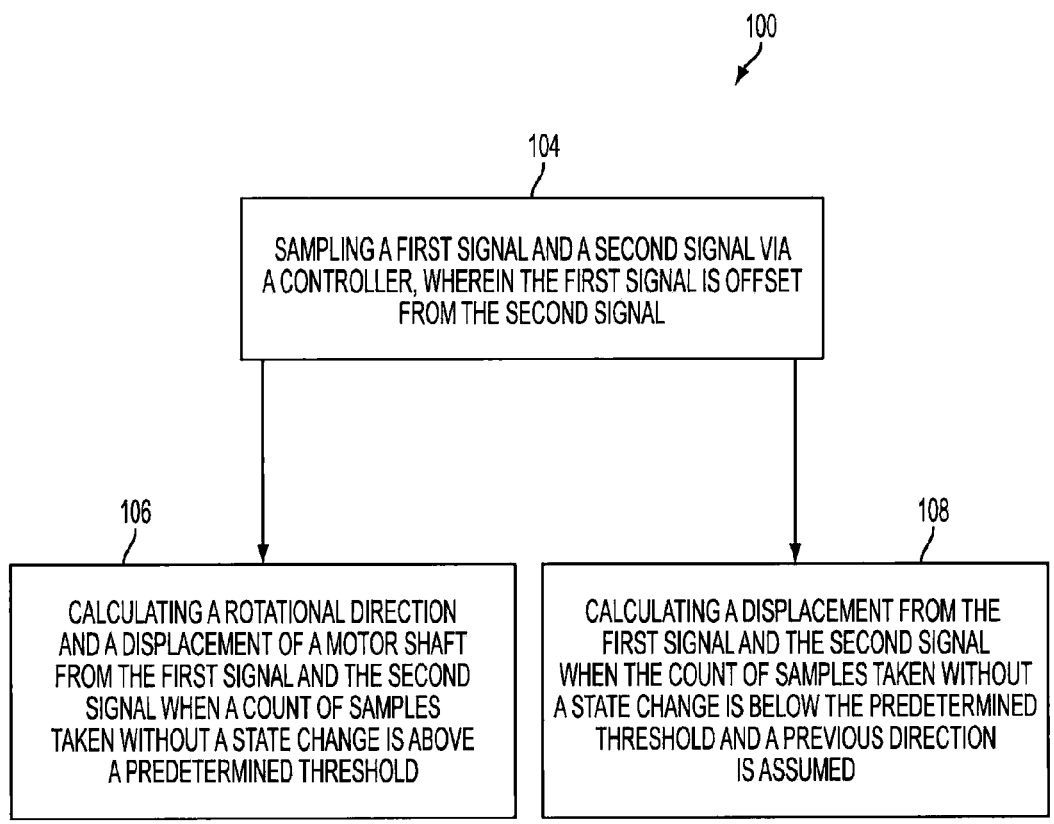
FIG. 1 illustrates a method of processing sensor signals to determine a motion of a motor shaft operating in accordance with an embodiment disclosed herein.

According to the principles disclosed herein, and as discussed below, the present disclosure provides methods and systems for processing sensor signals to determine motion of a motor shaft. In one form, the present disclosure also provides a method of processing sensor signals to determine a speed of a motor. The phrase "direction of the motor" will sometimes be used herein to refer to the rotational direction of the motor. The term "motion" as it relates to determining the "motion" of the motor shaft, sometimes includes rotational direction, rotational displacement, speed determinations, phase determinations, or a combination thereof.

This disclosure relates to the processing of sequences of pulses from a sensor for computing the motion of an electric motor output shaft. More specifically this disclosure relates to the processing of two sequences of pulses from sensor outputs, which may be separated by only a few electrical degrees, to compute the motion of an electrical motor output shaft while using a limited bandwidth controller. In some embodiments, the computed motion of the motor shaft is the displacement and direction of travel of an electrical motor output shaft.

Incremental optical encoders may generate two sequence pulses with variable frequency and a phase shift of 90 electrical degrees. The combination of these two signals is then decoded by an embedded controller to compute displacement and direction of travel.

The direction of rotation and angular displacement of an electric motor may be determined by detecting the leading sequence and by the pulse count of both pulses. The sequence of both pulse sets may be sampled at a fixed rate to read the state and the number of state changes of the pulse sets. A state change may also be referred to as a phase change.

If, however, due to bandwidth limitation of the controller, the two sequences of pulse sets are not sampled at a fast rate, the pulse count and state change of the pulses may be missed, resulting in an incorrect determination of the displacement and direction of travel.

In some embodiments of the present disclosure, a controller with limited sampling capability may be used to process pulse sets which may be only a few electrical degrees apart, to determine the displacement and direction of travel. In another embodiment, the offset of the pulse sets may be indistinguishable by the controller.

This method comprises first detecting the phase difference of the pulse set. If the phase difference is above a certain threshold, then it is evident that the motor is rotating slowly enough that the sampling rate is adequate to capture every state change of the pulse sets. In this case, the combination of the two signals is used to determine the direction and displacement of the motor shaft.

If, however, it is detected that the signals are not sampled fast enough for the combination, then each individual signal is used to determine the displacement only. The direction of travel remains the same as the one identified in the low speed case, since the motor cannot reverse direction before slowing down.

Figure 6:
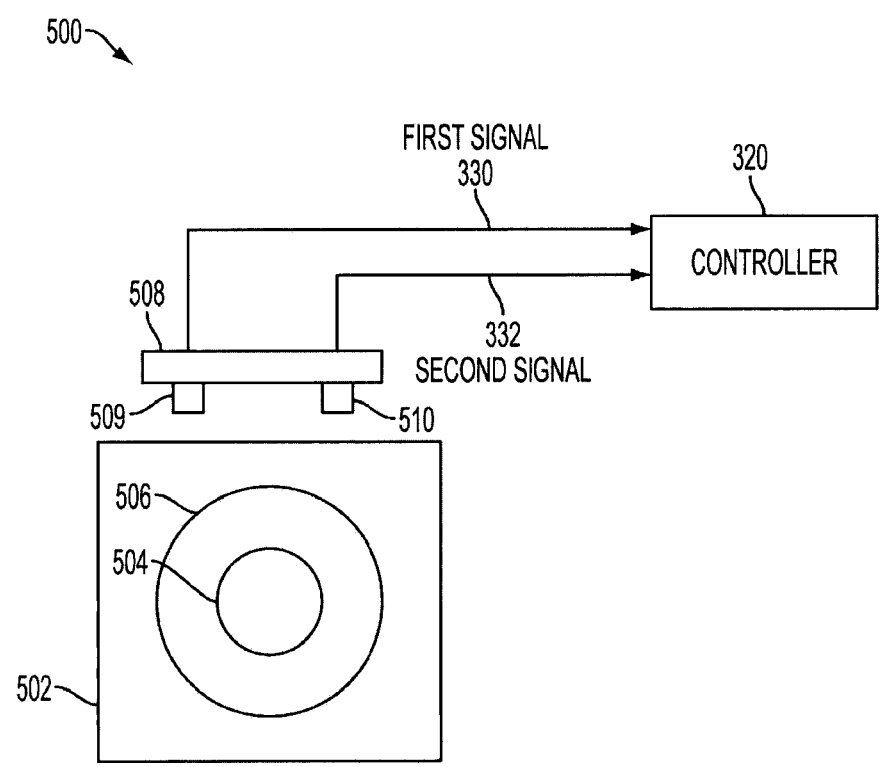
FIG. 6 illustrates a front view of the system further showing a motor and a motor shaft in accordance with an embodiment disclosed herein.

In a typical device in which the present methods and systems would be useful, a motor is coupled to a motor shaft, where the motor is powered to turn the motor shaft. A detectable feature or disc is coupled to the motor shaft where the detectable feature or disc may be a magnetic disc, an encoder disc, or any device that can work with sensors to produce signals when the motor shaft rotates. Instead of a disc, individual magnets placed on the shaft may also be used. In another embodiment, the motor shaft itself may be magnetic. If a Hall effect detection device is used as the detection device, the Hall effect sensors are placed at a distance apart from the motor shaft (as shown in FIG. 6 for example) such that the sensors return a signal that corresponds to the position of the magnets or magnetic disc on the motor shaft. In some embodiments, a single sensor and signal may be used to determine a displacement. In some embodiments, a single sensor and signal may be used to determine a speed. In some embodiments, a sensor may be used to measure more than one aspect of the motion of the motor shaft, including, but not limited to, rotation direction, rotation displacement, speed, or phase.

If a rotary encoder is used as the detection device, a sensor senses the motion of a rotating wheel that includes a series of evenly spaced apart openings. In a typical rotary encoder, a wheel with two tracks or rows or of slots are used, where the two tracks are offset from each other and one track is closer to the center of the disc than the other outer track. Each track of the encoder may correspond to an emitter and a sensor. For example, emitter A corresponds to track A where energy from the emitter A passes through the slits of track A to be detected by sensor A, which generates a first signal, and emitter B corresponds to track B where energy from the emitter B passes through the slits of track B to be detected by sensor B, which generates a second signal. The rotary encoder may typically comprise a light emitter on one side of the rotary wheel or graduated disc with slits or openings that allow light from the light emitter to pass through the slits in the disc to be detected by a sensor on the opposite side of the disc. The light may be passed through or blocked alternatively as the disc rotates. In other embodiments, a linear encoder may be used. In some embodiments, a row with a single slot may be used with a third sensor to generate a third pulse to count each rotation of the motor shaft. In some embodiments, the emitter may be an infrared emitter. In some embodiments, the sensors may be phototransistors.

The detection device discussed herein may be an incremental encoder, a serial encoder, a rotary encoder, an absolute encoder, a resolver, a tachometer, a Hall effect detection device with Hall effect sensors, or any sensor or device used to generate signals. These signals are then sent to a controller for processing. The method discussed herein may be implemented in software, in particular a series of controller execution instructions. The controller may be a processor, a microprocessor, a microcontroller, or any device that incorporates the functions of a computer's central processing unit (CPU) onto a single or multiple integrated circuits. The controller or microprocessor may be of any speed or have any bandwidth. In a signal processing system, the controller may be burdened with other tasks no matter the capability of the controller, thus any method or system that allows functions to be performed without burdening the controller are desired. Upgrading the controller may not solve this problem, and faster controllers or controllers with greater bandwidth are typically more expensive. Thus, the methods and systems disclosed herein provide for the processing of signals when the controller can spare a limited sampling capability to the signal processing task.

The disclosed methods and systems are useful in any device that processes signals, but it is particularly useful in devices that further include sensors that detect the rotation of motor shafts coupled to motors. One example of such a device is a park pawl or parking pawl.

A park pawl system is a system with a parking pawl or device fitted to a motor vehicle's automatic transmission in order for it to lock the transmission. The parking pawl is engaged when the transmission shift lever selector is placed in the "Park" position. The "Park" position is typically the first position, topmost on a column shift or frontmost on a floor shift, in vehicles such as automobiles. In other vehicles, a button may be pressed to engage the park pawl system. The parking pawl locks the transmission's output shaft to the transmission casing by engaging the pawl, actuating mechanism, or a nut, that engages in a notched wheel on the transmission's output shaft, stopping it, and thus the wheels of the vehicle, from rotating. This locks the automobile in a parked position.

Typically, it is not recommended to use the transmission's parking pawl as the sole means of securing a parked vehicle. Instead, the parking pawl should only be engaged after first applying the vehicle's parking brake, because constant use of only the parking pawl, especially when parking on a steep incline, means that driveline components, and transmission internal components, are kept constantly under stress. This can cause wear and eventual failure of the parking pawl or transmission linkage. The pawl might also fail or break if the vehicle is pushed with sufficient force when the parking brake is not firmly engaged. Replacement of these parts can be expensive since it often requires removing the transmission from the car. The park pawl, actuating mechanism, or nut may also break if it is engaged with too much force by the parking pawl system itself. Thus, methods and systems to control the motion of the parking pawl are needed, which are fulfilled by the disclosed embodiments.

Figure 5:
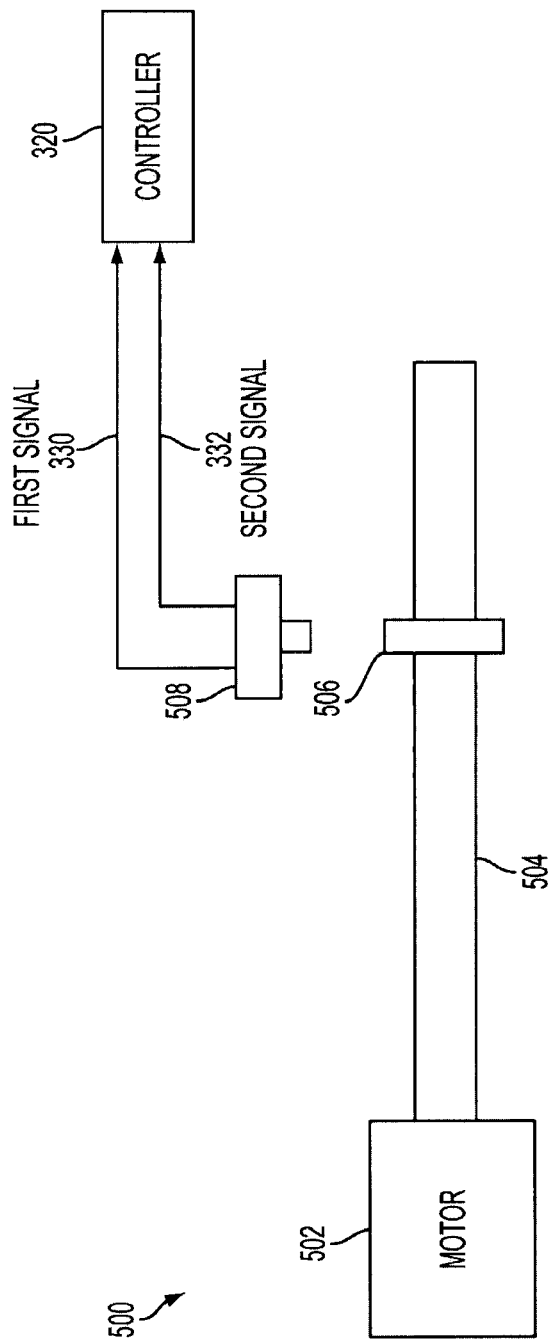
FIG. 5 illustrates a side view of the system further showing a motor and a motor shaft in accordance with an embodiment disclosed herein.
Figure 7:
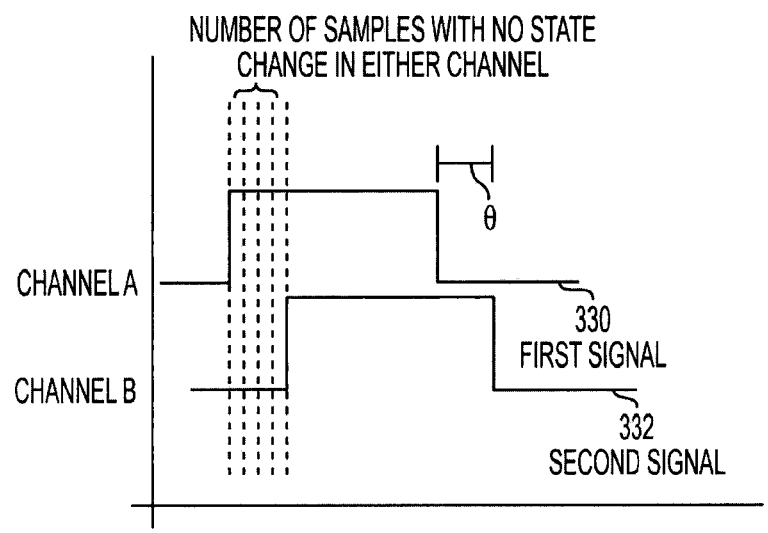
FIG. 7 illustrates a signal diagram useful in explaining sampling and an offset.

FIG. 1 illustrates a method 100 of processing sensor signals to determine a motion of a motor shaft of a motor 502 (FIG. 5). In some embodiments, the a motion of a motor shaft may include, but is not limited to, one or any combination, of the rotational direction, rotational displacement, speed, phase, or phase offset. As is described below in more detail with reference to FIG. 3, the method 100 is performed on a controller 320 in electrical communication with a first sensor and a second sensor. The method 100 may be implemented in software, in particular a sequence of controller execution instructions. The controller 320 may be a processor, a microprocessor, a microcontroller, or any device that incorporates the functions of a computer's central processing unit (CPU) onto a single or multiple integrated circuits. The first sensor 302 produces a first signal 330, and the second sensor 303 produces a second signal 332, where the first signal 330 is offset (shown by $\theta$ in FIG. 7) from the second signal 332 by a number of electrical degrees. The first signal 330 may be from Channel A (FIG. 7), and the second signal 332 may be from Channel B (FIG. 7). Typically, quadrature output signals are offset by ¼ of their output period, which is normally 90 electrical degrees. Embodiments disclosed herein are useful in these systems, but are more useful in systems where the offset is closer together or harder or even impossible to detect. Limitations in the controller 320 or in the sensor for example, may result in offsets that are only a few degrees apart. Offsets other than 90 degrees or only a few degrees may also be referred to as quadrature-like offsets. Limitations of the system may result in the offset being small enough that the controller 320 cannot distinguish any effective offset, or any offset at all. Limitations of the system may even detect the first signal 330 and the second signal 332 as being in phase with each other. These limitations in a system would make a determination of direction based on the offset to be difficult or impossible without the methods or systems disclosed herein.

Hall effect detection devices may have these limitations when the two Hall effect sensors are not separated far enough apart due to external mechanical limitations, such as the size of the space the sensors are located in. Other factors may be responsible for or may contribute to the size of the offset as well. The methods described herein may be useful at any electrical degree offset between the first signal 330 and the second signal 332, however the methods are more useful at offsets of 30 or less electrical degrees, even more useful at offsets of 10 or less electrical degrees, and even more useful at offsets of 5 or less electrical degrees. In some embodiments, the methods described herein are particularly useful even when the electrical degree offset between the first signal 330 and the second signal 332 cannot be determined. For example, in one embodiment disclosed herein, the offset between the first signal 330 and the second signal 332 may be 4 degrees apart at low speeds, and less than 4 degrees apart at fast speeds, but the system may not be able to measure the exact offset, or may not even be able to measure if there is an offset. In another embodiment, the signals may be produced in a quadrature phase relationship, where the periodic waveform of the two signals' phase difference is ¼ of their output period. In other embodiments, the phase difference between the first signal 330 and the second signal 332 may be less than 90 degrees. In another embodiment, the phase difference may be something other than 90 electrical degrees.

At step 104, the controller 320 samples the first signal 330 and the second signal 332. At step 106, the controller 320 calculates a direction and displacement of a motor shaft 504 (FIG. 5) from the first signal 330 and the second signal 332 when a count of samples taken without a state change being detected is above a predetermined threshold. In one embodiment, the threshold is at least three samples needed to detect the slow speed. If the number of samples taken is below the threshold, the motor is turning at a fast speed. This may be due to the controller being unable to sample fast enough to detect a state change. In another embodiment, the sampling rate is at one millisecond for a loop time. The threshold may be any number of samples depending on the ability of the controller 320 or the limitations of the sensor.

In another embodiment, the state change may be assumed based on a number of electrical degrees elapsing, where a certain number of samples are taken within a certain number of electrical degrees that may be seen on a signal pulse chart. For example, in one embodiment if only two samples are taken before a state change, when the threshold is set to three samples taken, the motor speed is fast, while if three or more samples are taken, the motor speed is slow. In another example embodiment, where the change of state is based on a number of electrical degrees, if two samples are taken in 90 electrical degrees represented by a signal on a pulse chart, when the threshold is set to three samples taken, the motor speed is fast. In another embodiment, the state change may be assumed based on a time elapsing, where a certain number of samples are taken in a certain time.

At step 108, the controller 320 calculates a displacement from the first signal 330 and the second signal 332 while assuming a previous direction when the count of samples taken without a state change is below the threshold. The previous direction may be assumed based on the last measurement taken at the speed that was slow enough for the controller 320 to determine a direction of the motor 502. In one embodiment, the previous direction measurement may be stored in a memory. The method 100 may be particularly useful when the controller 320 is unable to detect every incoming sample of the pulse set. In a desired embodiment, step 106 and step 108 occur at the same time.

In a desired embodiment, step 106 further comprises detecting a phase offset between the first signal 330 and the second signal 332, when the motor 502 is at speeds low enough that the controller 320 can detect a phase offset between the first signal 330 and the second signal 332, to determine the direction of the motor shaft 504. An offset or phase offset may also be referred to as a phase shift.

In a typical quadrature phase relationship, the first signal 330 and the second signal 332 are offset from each other by a quarter of their output period. Often this offset is 90 electrical degrees. The disclosed methods may be useful in these systems, particular when the controller 320 has a limited sampling capability, either inherently, or based on current usage. The disclosed systems may also be effective when the first signal 330 and the second signal 332 are offset from each other by 5 or less electrical degrees. In addition, the disclosed methods and systems may be particularly useful when no offset may be determined.

Figure 2:
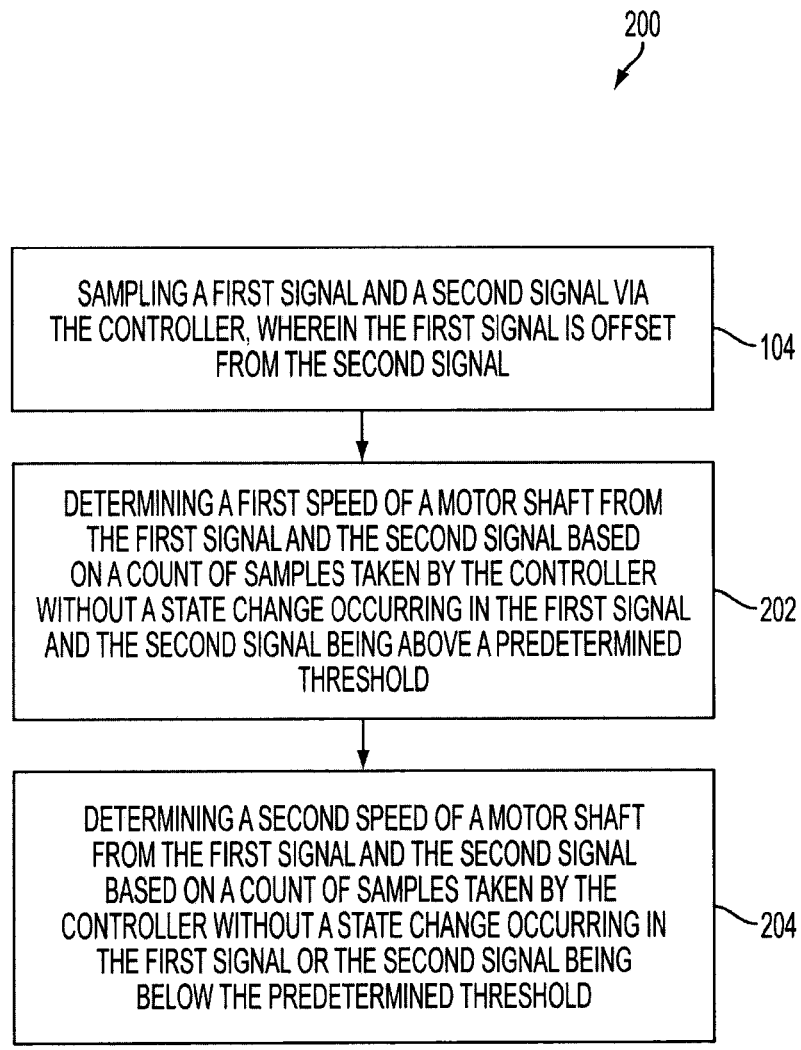
FIG. 2 illustrates another method of processing sensor signals to determine a motion of a motor shaft operating in accordance with an embodiment disclosed herein, wherein a speed of the motor shaft is determined.

FIG. 2 illustrates another method 200 of processing sensor signals to determine a motion of a motor shaft of a motor 502 (FIG. 5). In the embodiment of FIG. 2, a speed of a motor shaft is determined. As is described below in more detail with reference to FIG. 3, the method 200 is performed on the controller 320 that is connected to the first sensor 302 and second sensor 303. The method 200 may be implemented in software, in particular a sequence of controller execution instructions. The controller 320 may be a processor, a microprocessor, a microcontroller, or any device that incorporates the functions of a computer's central processing unit (CPU) onto a single or multiple integrated circuits. At step 104, the controller 320 samples the first signal 330 and the second signal 332, where the first signal 330 is offset from the second signal 332. At step 202, the controller 320 determines a first speed of the motor shaft 504 from the first signal 330 and the second signal 332 by the outcome of a count of samples taken without a state change being above a threshold. In another embodiment, the state change may be assumed based on a number of electrical degrees elapsing, where a certain number of samples are taken in a certain number of electrical degrees that may be seen on a signal pulse chart. As mentioned above, in one embodiment, if only two samples are taken before a state change, when the threshold is set to three samples taken, the motor speed is fast, while if three or more samples are taken, the motor speed is slow. In another example embodiment, where the change of state is based on a number of electrical degrees, if two samples are taken in a certain number of electrical degrees as represented by a signal on a pulse chart, when the threshold is set to three samples taken, the motor speed is fast. In another embodiment, the state change may be assumed based on a time elapsing, where a certain number of samples are taken in a certain time. At step 204, the controller 320 determines a second speed of the motor shaft 504 from the first signal 330 and the second signal 332 by the outcome of a count of samples taken without a state change being below the threshold. The method 200 is particularly useful when the controller 320 is unable to detect every incoming sample of the pulse set. In another embodiment, the motor speed may be determined based on one signal sampled by the controller 320.

As described above, the methods described herein may be useful at any electrical degree offset between the first signal 330 and the second signal 332, however the methods are more useful at offsets of 30 or less electrical degrees, even more useful at offsets of 10 or less electrical degrees, and even more useful at offsets of 5 or less electrical degrees. In some embodiments, the methods described herein are particularly useful even when the electrical degree offset between the first signal 330 and the second signal 332 cannot be determined. For example, in one embodiment disclosed herein, the offset between the first signal 330 and the second signal 332 may be 4 degrees apart at low speeds, and less than 4 degrees apart at fast speeds, but the system may not be able to measure the exact offset, or may not even be able to measure if there is an offset. In an embodiment where the phase offset decreases as the rotational speed of the motor shaft increases, the samples taken by the controller before a state change is detected are decreased below a predetermined threshold such that a fast speed is determined due to the decreased sample count. In another embodiment, the signals may be produced in a quadrature phase relationship, where the periodic waveform of the two signals' phase difference is ¼ of their output period. In other embodiments, the phase difference between the first signal 330 and the second signal 332 may be less than 90 degrees. In another embodiment, the phase difference may be something other than 90 electrical degrees. In another embodiment, the phase difference may be 90 electrical degrees.

Figure 3:
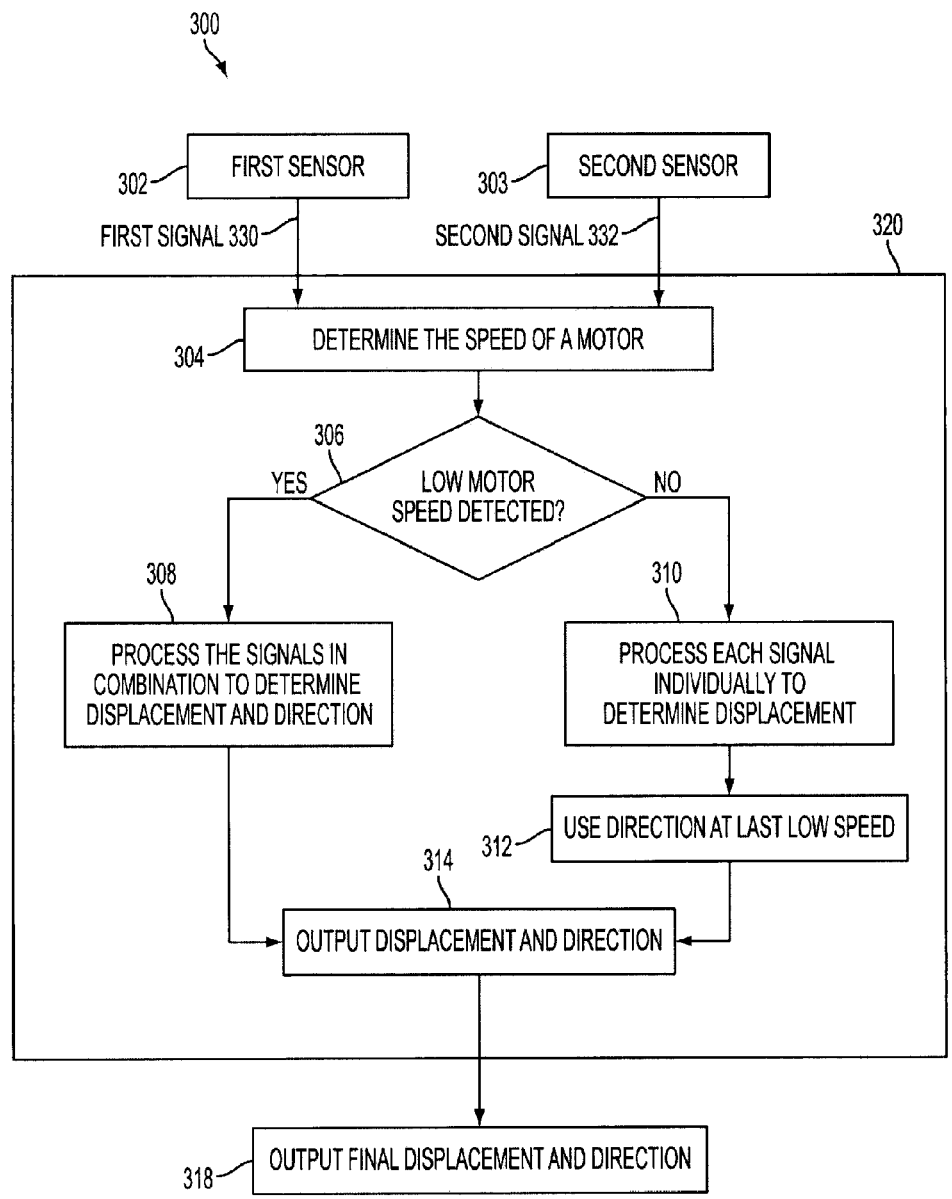
FIG. 3 is a block diagram of a system for processing sensor signals to determine a direction of a motor operating in accordance with an embodiment disclosed herein.

FIG. 3 illustrates a system 300 for processing sensor signals to determine a direction of the motor 502. As mentioned above, the first sensor 302 generates a first signal 330, and the second sensor 303 generates a second signal 332 and the first and second signals 330, 332 are sampled by the controller 320. FIG. 3 also illustrates steps performed by the controller 320. At step 304, controller instructions are performed to determine the speed of the motor 502. At step 306, controller instructions are performed to determine whether the motor speed is low.

If the motor speed is low in step 306, the instructions proceed to step 308 where the controller processes the signals in combination to determine displacement and direction of the motor 502. After step 308, the instructions proceed to step 314, which outputs displacement and direction. In a process where the motor speed is determined to be low in step 306, the displacement and direction that is determined at that low speed is output in step 314. A low motor speed may also be referred to as slow.

If instead at step 306 the motor speed is determined not to be low (i.e., it is high), the instructions proceed to step 310 where the controller 320 processes the first signal 330 and second signal 332 individually to determine displacement at step 310. A high motor speed may also be referred to as fast. At step 312, the direction of the motor 502 at the fast speed is determined by assuming the previous direction of the motor 502 at the last low speed measurements taken. In some embodiments, the last low speed direction measurement taken may be from a previous loop of the instructions. At step 314, the controller outputs the displacement and direction of the motor 502. In a process where the motor speed is determined to be fast in step 306, the displacement determined from step 310 and the direction determined from step 312 is output in step 314.

In another embodiment, the controller instructions may loop back to step 304 to sample the first signal 330 and the second signal 332 again to determine a new motor speed, direction, and displacement. A final displacement and direction are output at step 318.

Figure 4:
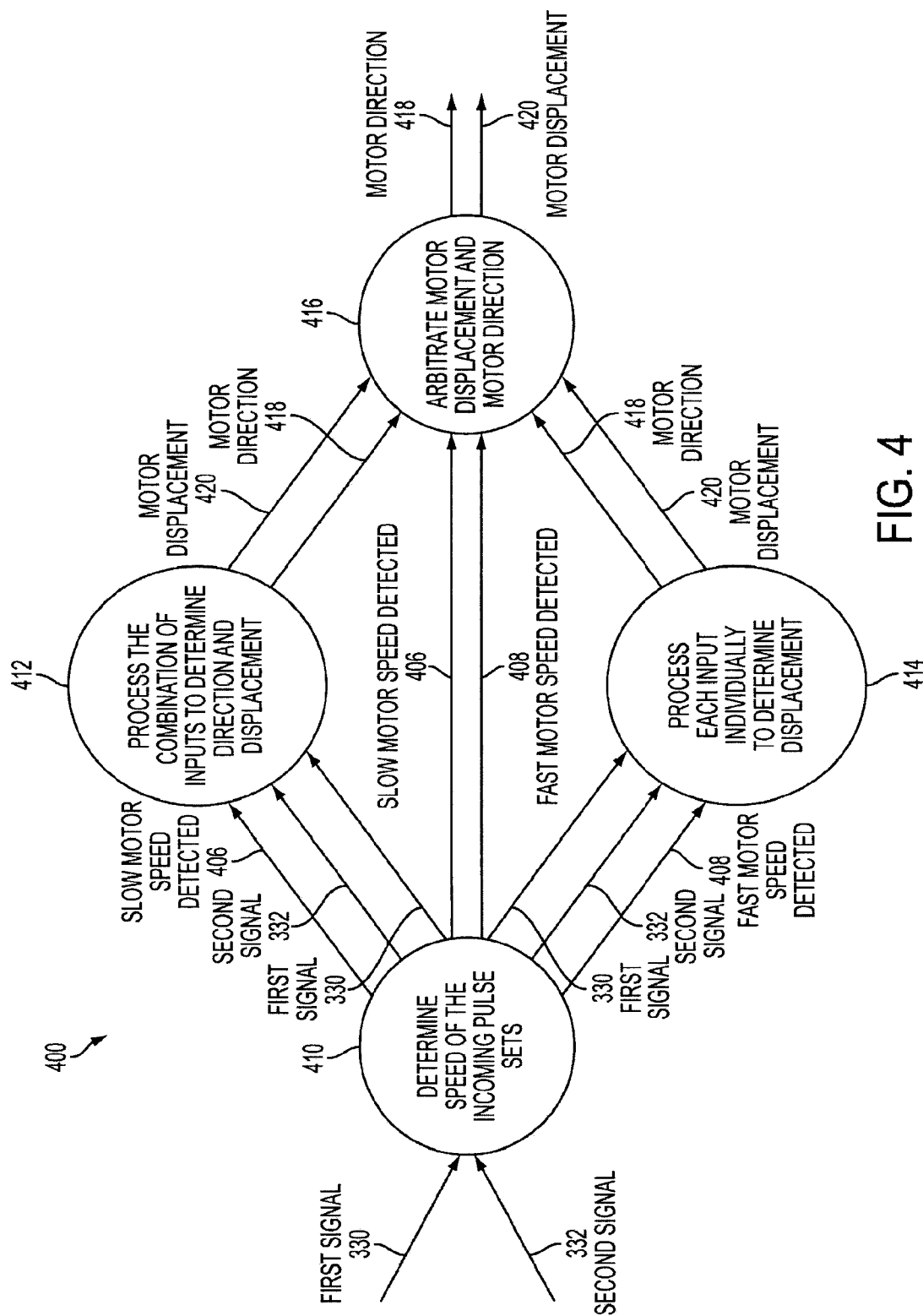
FIG. 4 illustrates another method of processing sensor signals to determine a motion of a motor shaft operating in accordance with an embodiment disclosed herein.

FIG. 4 illustrates another method 400 of processing sensor signals to determine a direction and a displacement of a motor 502. As with the other methods described herein, the first sensor 302 produces the first signal 330, and the second sensor 303 produces the second signal 332, where the first signal 330 is offset from the second signal 332. The first signal 330 and the second signal 332 may also be called pulse sets. The first signal 330 and the second signal 332 are sampled by the controller 320 to determine the speed of the motor 502 at step 410. Once the speed of the motor 502 is determined at step 410, the controller 320 performs other processes based on the speed. The method 400 may be implemented in software, in particular a sequence of controller execution instructions. The controller 320 may be a processor, a microprocessor, a microcontroller, or any device that incorporates the functions of a computer's central processing unit (CPU) onto a single or multiple integrated circuits.

If the motor speed is slow, the controller 320 processes the combination of inputs to determine direction and displacement. The controller 320 uses the first signal 330 and the second signal 332, as well as the speed determination made at step 410 to determine the direction and displacement of the motor 502 at step 412. At step 414, the controller 320 processes each input individually to determine displacement, but not direction. Instead, direction is assumed based on a previous low speed determination of direction, because the motor 502 would have had to slow down first to change directions. Thus, if the motor 502 is now at a fast speed, when previously it was at a low speed, it can be assumed that the motor 502 is still rotating in the same direction because no change in direction was taken at the low speed. Also, after determining the speed of the incoming pulse sets at step 410, the flags of the slow motor speed detected 406, and fast motor speed detected 408 are forwarded for use at step 416 to arbitrate the motor direction and motor displacement. At step 416, the controller 320 decides which set of data to use, based on what speed the motor 502 is at. The motor displacement and motor direction are then outputted for subsequent use.

For example, the motor displacement and motor direction may be used in a vehicle's park lock system to determine how far an actuating mechanism has moved along a shaft that is turned directly or indirectly by the motor 502. In a park pawl system, the pawl locks into a portion of the vehicle transmission, preventing the transmission, and thus the wheels of the vehicle, from rotating. In such a system it may be desirable to slow the speed of the actuating mechanism before it reaches its end position to prevent jamming of the actuating mechanism against the hard-stop at the end position which can damage the actuating mechanism, motor shaft, or the transmission.

In a parking pawl system, the motor direction and displacement is used to control the speed of an actuating mechanism or a nut rotating on a shaft. If the actuating mechanism or nut is determined to be going fast and is towards the end of the shaft where it will then lock the transmission shaft into place, the nut is slowed so that it does not contact its resting place at a high rate of speed which may damage the nut or other parts of the system. The park pawl actuating mechanism may be a nut, or any device that may be rotated by a shaft and used to lock the transmission in place.

FIG. 5 illustrates one embodiment of a system 500 showing the motor 502 and the motor shaft 504. The motor 502 is connected to the motor shaft 504 such that when the motor 502 is turned, the motor shaft 504 rotates. This rotational motion also turns the detectable feature 506. The detectable feature 506 may be a disc surrounding the shaft 504; it should be appreciated that the detectable feature 506 may also be a magnet or series of magnets spaced apart from each other on the motor shaft 504. The detectable feature 506 may also be a feature of the motor shaft 504, for example a series of magnetic poles embedded in the motor shaft 504 or making up the motor shaft 504 itself. In one embodiment, the detectable feature 506 is a ring magnet for use with a Hall effect sensor.

A detection device 508 generates the first signal 330 and the second signal 332 by detecting the rotation of the motor shaft 504 through the detectable feature 506. In one embodiment, the detection device 508 may be two Hall effect sensors, each generating a signal to be sampled by the controller 320. Generally, the motor 502 may be any electromechanical device that turns electric energy into mechanical energy, or any device that turns a motor shaft 504.

FIG. 6 illustrates a front view of the system 500 in accordance with an embodiment disclosed herein. In the illustrated embodiment, the detecting device 508 has two sensors 509, 510. In some embodiments, the sensors are electrically coupled to or in electrical communication with a portion of the motor shaft. In the embodiment of FIG. 6, the sensors 509, 510 are Hall effect sensors or switches that are separated by a distance from each other. The distance these sensors 509, 510 are separated from each other may effect how far apart the first signal 330 and second signal 332 are offset from each other on a pulse chart. In the embodiment of FIG. 6, the detectable feature 506 is a magnetic wheel with magnetic poles that are detected by the sensors 509, 510 as the motor shaft 504 rotates. Their may be any number of magnetic poles on the detectable feature 506. In one embodiment, the detectable feature 506 may have six poles. In another embodiment, the detectable feature 506 may have three poles. In a preferred embodiment, use a Hall effect sensor and magnetic wheel is how the signals 330, 332 are generated that are processed by the controller 320.

FIG. 7 illustrates a signal diagram useful in explaining sampling and an offset, θ. In particular FIG. 7 is useful in explaining a method 200 of determining a speed of a motor 502 (FIG. 5). As described above, the first signal 330 is offset, θ, from the second signal 332 by a number of electrical degrees. The first signal 330 may be from Channel A, and the second signal 332 may be from Channel B (FIG. 7). In the embodiment shown in FIG. 7, a number of samples are taken by the controller 320 within the phase offset, θ, with no state change occurring in either Channel A or Channel B. As is described above in more detail, if the number of samples with no state change in either Channel A or Channel B is greater than a threshold, then the motor speed is determined to be slow, and if the number of samples with no state change in either Channel A or Channel B is less than a threshold, then the motor speed is determined to be fast. For example, in one embodiment shown in FIG. 7, the number of samples taken by the controller is five. In this example, if the threshold is set to three, then the motor speed is determined to be slow because three samples were taken without a state change occurring, however if only two samples were taken without a state change occurring, then the motor speed would be determined to be fast. In other embodiments, any number of samples may be taken, and the threshold may be set to any number of samples.

Figure 8:
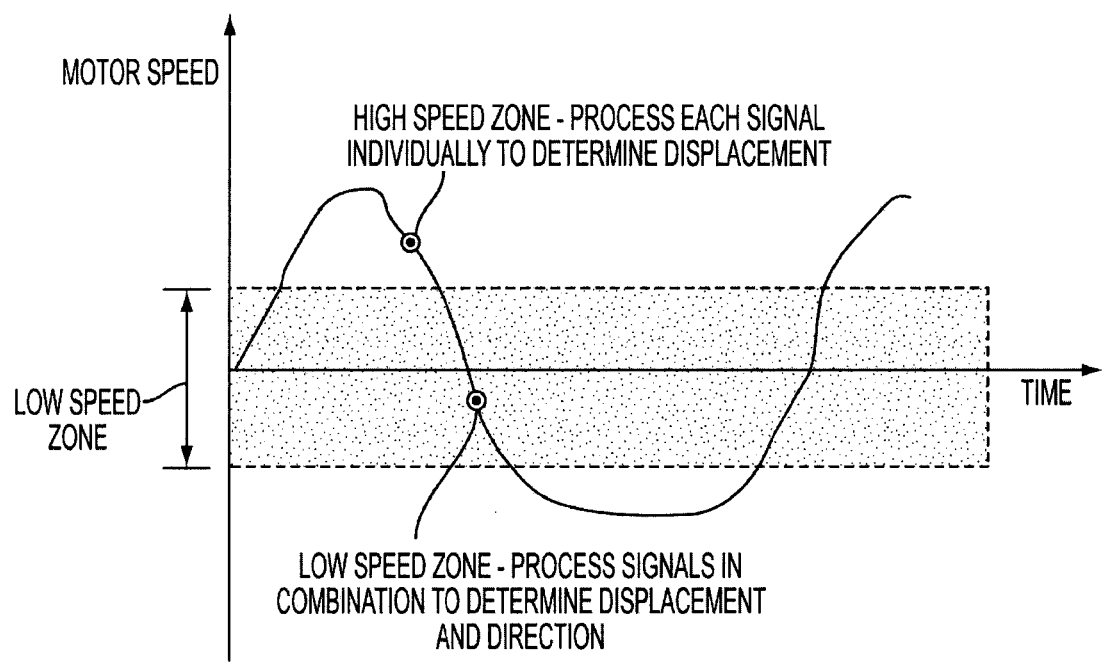
FIG. 8 illustrates a signal diagram useful in explaining a method of determining a speed of a motor.

FIG. 8 illustrates a diagram useful in explaining a method 200 of determining a speed of a motor 502 (FIG. 5). In the embodiment shown in FIG. 8, a Low Speed Zone is shown, where the motor speed is determined to be low by the method 200 above, and the controller processes the signals in combination to determine displacement and direction. FIG. 8 also shows a High Speed Zone, where the motor speed is determined to be high by the method 200 above, and the controller processes each signal individually to determine displacement. In other embodiments, any number of changes in speed may occur.

Figure 9A:
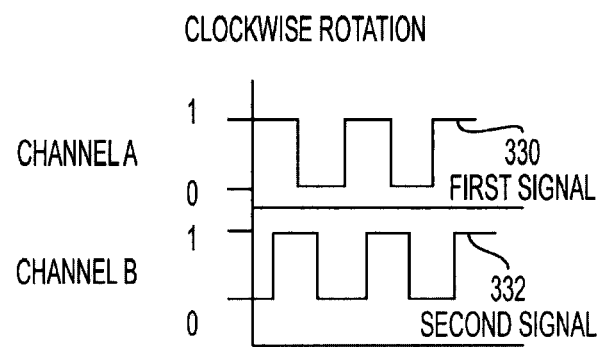
FIG. 9A illustrates output signals in a clockwise rotation.
Figure 9B:
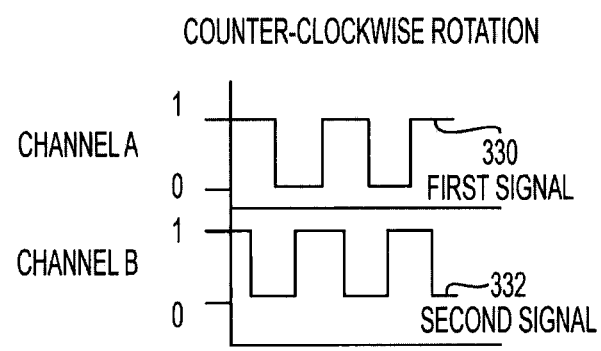
FIG. 9B illustrates output signals in a counter-clockwise rotation.

FIG. 9A illustrates output signals in a clockwise rotation. FIG. 9B illustrates output signals in a counter-clockwise rotation. In the embodiments shown in FIG. 9A and FIG. 9B, the offset from the first signal 330 from Channel A and the second signal 332 from Channel B are in a typical quadrature relationship offset at 90 degrees by way of illustration. As described above, other offsets may be used. In one embodiment, a signal is based on a voltage, the maximum output of the sensor is treated as a logical "1", while the zero output state of the sensor is treated as a logical "0". A state change occurs whenever one of the signals 330 or 332 changes from a "0" to a "1" or a "1" to a "0".

Figure 10:
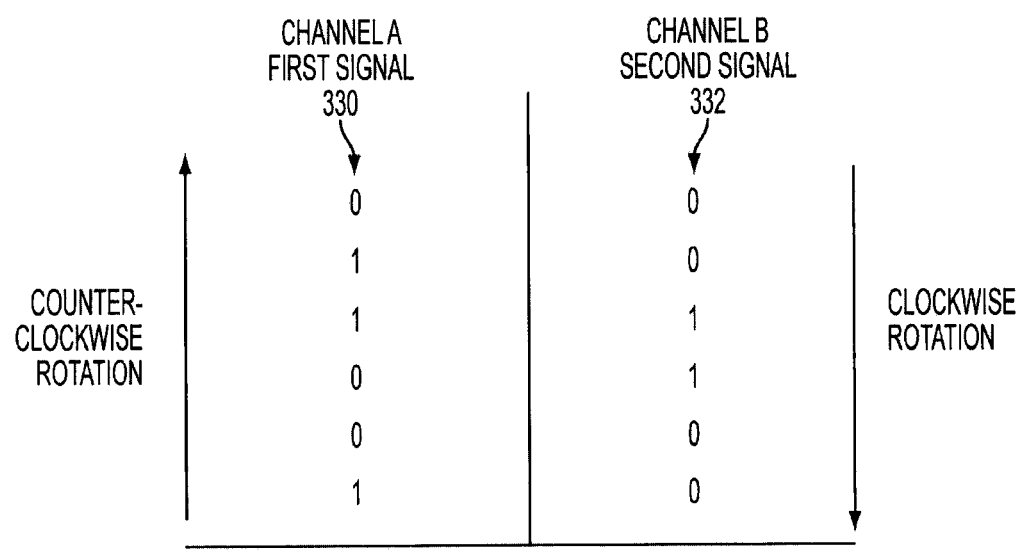
FIG. 10 is a table illustrating the outputs of Channel A and Channel B for a clockwise and a counter-clockwise direction.

FIG. 10 is a table illustrating the outputs of Channel A and Channel B for a clockwise and a counter-clockwise direction. FIG. 10 shows each possible combination of state changes from the outputs of Channel A and Channel B based on their direction of rotation.

In accordance with the practices of persons skilled in the art of computer programming, embodiments are described with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits. Embodiments may also encompass integrated circuitry including circuit elements capable of performing specific system operations.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc.

What is claimed is:

1. A method of processing sensor signals to determine motion of a motor shaft, said method comprising the steps of:
    sampling a first signal and a second signal via a controller, wherein the first signal is offset from the second signal;
    calculating a rotational direction and a displacement of the motor shaft from the first signal and the second signal when a count of samples taken without a state change is above a predetermined threshold; and calculating a displacement from the first signal and the second signal when the count of samples taken without a state change is below the predetermined threshold and a previous direction is assumed.

2. The method of claim 1, wherein calculating the rotational direction and displacement of the motor shaft from the first signal and the second signal when a count of samples taken without a state change is above a predetermined threshold further comprises:
  detecting a phase offset between the first signal and the second signal.

3. The method of claim 1, wherein calculating the displacement from the first signal and the second signal when the count of samples taken without a state change is below the predetermined threshold and a previous direction is assumed further comprises:
  detecting the first signal and the second signal as being in phase.

4. The method of claim 1, wherein the first signal and the second signal in the step of calculating the displacement from the first signal and the second signal when the count of samples taken without a state change is below the predetermined threshold and a previous direction is assumed are offset from each other by 5 or less electrical degrees.

5. The method of claim 1, where the state change is based on a number of elapsed electrical degrees of the first signal.

6. The method of claim 1, where the state change is based on an elapsed time.

7. The method of claim 1, wherein the first signal is input from a detection device selected from the group consisting of an incremental encoder, a serial encoder, a rotary encoder, an absolute encoder, a resolver, a tachometer, and a Hall effect detection device.

8. The method of claim 1, further comprising the steps of:
  determining a first speed of the motor shaft from the first signal and the second signal based on a count of samples taken by the controller without a state change occurring in the first signal and the second signal being above a predetermined threshold; and
  determining a second speed of the motor shaft from the first signal and the second signal based on a count of samples taken by the controller without a state change occurring in the first signal or the second signal being below the predetermined threshold.

9. The method of claim 1, wherein a speed of the motor shaft is determined from a sensor.

10. The method of claim 1, wherein the method is used in a park pawl system of a vehicle.

11. The method of claim 1, wherein the controller has a limited sampling capability.

12. The method of claim 1, wherein the first signal is input from a Hall effect sensor.

13. A method of processing sensor signals to determine motion of a motor shaft, said method comprising the steps of:
  sampling a first signal and a second signal via a controller, wherein the first signal is offset from the second signal;
  determining a first speed of the motor shaft from the first signal and the second signal based on a count of samples taken by the controller without a state change occurring in the first signal and the second signal being above a predetermined threshold;
  determining a second speed of the motor shaft from the first signal and the second signal based on a count of samples taken by the controller without a state change occurring in the first signal or the second signal being below the predetermined threshold; and
  calculating a displacement of the motor shaft from the first signal and the second signal, when the count of samples taken without the state change is above the predetermined threshold.

14. The method of claim 13, wherein the first signal is input from a Hall effect sensor.

15. The method of claim 13, further comprising the step of:
  calculating a rotational direction of the motor shaft from the first signal and the second signal.

16. The method of claim 13, further comprising the steps of:
  calculating a rotational direction and displacement of the motor shaft from the first signal and the second signal when the count of samples taken without the state change is above the predetermined threshold; and
  calculating a displacement from the first signal and the second signal when the count of samples taken without the state change is below the predetermined threshold and a previous direction is assumed.

17. The method of claim 13, further comprising the step of:
  calculating displacement and direction of the motor shaft from processing the first signal and the second signal in combination to determine the displacement and direction of the motor shaft.

18. The method of claim 13, further comprising the step of:
  calculating displacement of the motor shaft from processing the first signal and the second signal individually to determine the displacement of the motor shaft.

19. The method of claim 13, wherein the method is used in a park pawl system of a vehicle.

* * * * *